United States Patent
Dedo et al.

(10) Patent No.: US 9,156,353 B2
(45) Date of Patent: Oct. 13, 2015

(54) ACTIVE WHEEL HUB TRANSMISSION

(71) Applicant: Spicer Off-Highway Belgium N.V., Bruges (BE)

(72) Inventors: Jacqueline Dedo, Van Buren, MI (US); Steven J. Wesolowski, Waterville, OH (US); Donald J. Remboski, Ann Arbor, MI (US); Mark R. J. Versteyhe, Oostkamp (BE)

(73) Assignee: Dana Limited, Maumee, OH (US)

( * ) Notice: Subject to any disclaimer, the term of this patent is extended or adjusted under 35 U.S.C. 154(b) by 211 days.

(21) Appl. No.: 13/855,541

(22) Filed: Apr. 2, 2013

(65) Prior Publication Data

US 2013/0260961 A1 Oct. 3, 2013

Related U.S. Application Data

(60) Provisional application No. 61/619,474, filed on Apr. 3, 2012.

(51) Int. Cl.
| | |
|---|---|
| *F16H 3/44* | (2006.01) |
| *B60K 17/04* | (2006.01) |
| *B60K 28/16* | (2006.01) |
| *F16H 61/00* | (2006.01) |

(52) U.S. Cl.
CPC ............ *B60K 28/165* (2013.01); *B60K 17/046* (2013.01); *F16H 61/0059* (2013.01); *F16H 3/44* (2013.01); *Y10T 477/6403* (2015.01)

(58) Field of Classification Search
CPC ..... F16H 3/44; B60K 17/046; B60K 2007/00

USPC ........................... 475/317; 180/343, 369, 372
See application file for complete search history.

(56) References Cited

U.S. PATENT DOCUMENTS

| | | | | |
|---|---|---|---|---|
| 3,543,891 | A * | 12/1970 | Mathers | 477/92 |
| 5,024,636 | A * | 6/1991 | Phebus et al. | 475/141 |
| 5,846,153 | A * | 12/1998 | Matsuoka | 475/269 |
| 6,533,694 | B1 * | 3/2003 | Puetz et al. | 475/72 |
| 7,537,536 | B2 * | 5/2009 | Hvolka et al. | 475/146 |
| 2002/0023791 | A1* | 2/2002 | Kima et al. | 180/65.5 |
| 2011/0144874 | A1* | 6/2011 | Kirchner et al. | 701/67 |
| 2012/0161497 | A1* | 6/2012 | He et al. | 301/6.5 |

FOREIGN PATENT DOCUMENTS

WO 91/00443 A1 10/1991

* cited by examiner

*Primary Examiner* — Tisha Lewis
(74) *Attorney, Agent, or Firm* — Marshall & Melhorn, LLC

(57) ABSTRACT

A wheel hub transmission for a vehicle driveline is provided. The wheel hub transmission includes an input shaft, a planetary gear arrangement, a casing member, and a clutching device. The input shaft is drivingly engaged with a power source and the planetary gear arrangement. The planetary gear arrangement is drivingly engaged with the input shaft and is in one of driving engagement and selective driving engagement with the casing member. The clutching device may be selectively drivingly engaged with a portion of the planetary gear arrangement, wherein upon engagement of the clutching device the planetary gear arrangement is fixed. The wheel hub transmission facilitates a torque multiplication at the wheel hub transmission, which reduces an amount of torque applied to a portion of the vehicle driveline.

13 Claims, 2 Drawing Sheets

| FIRST CLUTCH | SECOND CLUTCH | ACTIVITY |
|---|---|---|
| DISENGAGED | DISENGAGED | NEUTRAL |
| DISENGAGED | ENGAGED | REDUCTION (SLOWER SPEED/HIGHER TORQUE) |
| ENGAGED | DISENGAGED | DIRECT DRIVE (TOP SPEED) |
| ENGAGED | ENGAGED | PARKING BRAKE |

ACTIVE WHEEL HUB TRANSMISSION

CLAIM OF PRIORITY

The present application claims the benefit of and incorporates by reference U.S. Provisional Application No. 61/619,474 filed Apr. 3, 2012, entitled "ACTIVE WHEEL HUB TRANSMISSION."

BACKGROUND OF THE INVENTION

The demand of modern consumers for vehicles that have increased efficiency and are capable of shifting gears very smoothly has increased dramatically. To meet such a demand, manufacturers of vehicles increasing a number of transmission gears to smooth shifting. Increasing the number of transmission gears enables one to distribute a total gear ratio spread over a higher number of gears, resulting in a better approximation of an optimal traction curve and thus the vehicle has a higher available torque. However, such an approach requires a complex hardware and controls arrangement. An object of the present invention is to provide a more responsive driveline without the need for a more complex transmission.

A conventional driveline for a vehicle includes a power source (such as an internal combustion engine, an electric motor, or a combination of the two), a transmission (manual or automatic), and a differential drivingly engaged with a pair of axle half shafts. The transmission and the differential are necessary to achieve a torque multiplication between the powers source and the pair of axle half shafts. As a non-limiting example, a typical passenger vehicle has a reduction a ratio of 3-4 between the power source and the pair of axle half shafts. Such a reduction ratio may introduce high torques on a drive shaft and other mechanical parts (such as prop shafts and constant velocity joints).

It would be advantageous to develop a driveline having a transmission capable of shifting gears smoothly without increasing a complexity of the transmission that reduces high torques on components of the driveline.

SUMMARY OF THE INVENTION

Presently provided by the invention, a driveline including a continuously variable transmission that is inexpensive, compact, may be configured for a wide range of torque distributions, and able to adjust a drive ratio has surprisingly been discovered.

In one embodiment, the present invention is directed to a wheel hub transmission comprising an input shaft, a planetary gear arrangement, a casing member, and a clutching device. The input shaft is drivingly engaged with a power source and the planetary gear arrangement. The planetary gear arrangement includes a first portion, a second portion, and a third portion. The first portion is drivingly engaged with the input shaft and the second portion is drivingly engaged with the first portion and the third portion. The casing member is in one of driving engagement and selective driving engagement with the third portion. The clutching device may be selectively drivingly engaged with one of the first portion of the planetary gear arrangement and the input shaft and the second portion of the planetary gear arrangement. Upon one of engagement and disengagement of the clutching device the first portion of the planetary gear arrangement is fixed with respect to the second portion of the planetary gear arrangement.

In another embodiment, the present invention is directed to a wheel hub transmission comprising an input shaft, a planetary gear arrangement, a casing member, a wheel rim, a first clutching device, and a second clutching device. The input shaft is drivingly engaged with a power source and the planetary gear arrangement. The planetary gear arrangement includes a first portion, a second portion, and a third portion. The first portion is drivingly engaged with the input shaft and the second portion is drivingly engaged with the first portion and the third portion. The casing member is in one of driving engagement and selective driving engagement with the third portion. The wheel rim is in driving engagement with the second portion of the planetary gear arrangement. The first clutching device may be selectively drivingly engaged with one of the first portion of the planetary gear arrangement and the input shaft and the second portion of the planetary gear arrangement. The second clutching device may be selectively drivingly engaged with the third portion of the planetary gear arrangement and the casing member. Upon one of engagement and disengagement of the first clutching device, the first portion of the planetary gear arrangement is fixed with respect to the second portion of the planetary gear arrangement and upon one of engagement and disengagement of the second clutching device the third portion of the planetary gear arrangement is fixed with respect to the casing member.

In another embodiment, the present invention is directed to a wheel hub transmission comprising an input shaft, a planetary gear arrangement, a casing member, a wheel rim, a first clutching device, and a second clutching device. The input shaft is drivingly engaged with a power source and the planetary gear arrangement. The planetary gear arrangement includes a sun gear, a carrier having a plurality of planet gears rotatably disposed thereon, and a ring gear. The sun gear is drivingly engaged with the input shaft and the plurality of planet gears is drivingly engaged with the sun gear and the ring gear. The casing member is in one of driving engagement and selective driving engagement with the ring gear. The wheel rim is in driving engagement with the carrier of the planetary gear arrangement. The first clutching device may be selectively drivingly engaged with one of the sun gear and the input shaft and the carrier. The second clutching device may be selectively drivingly engaged with the ring gear and the casing member. Upon one of engagement and disengagement of the first clutching device the sun gear is fixed with respect to the carrier and upon one of engagement and disengagement of the second clutching device the ring gear is fixed with respect to the casing member.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
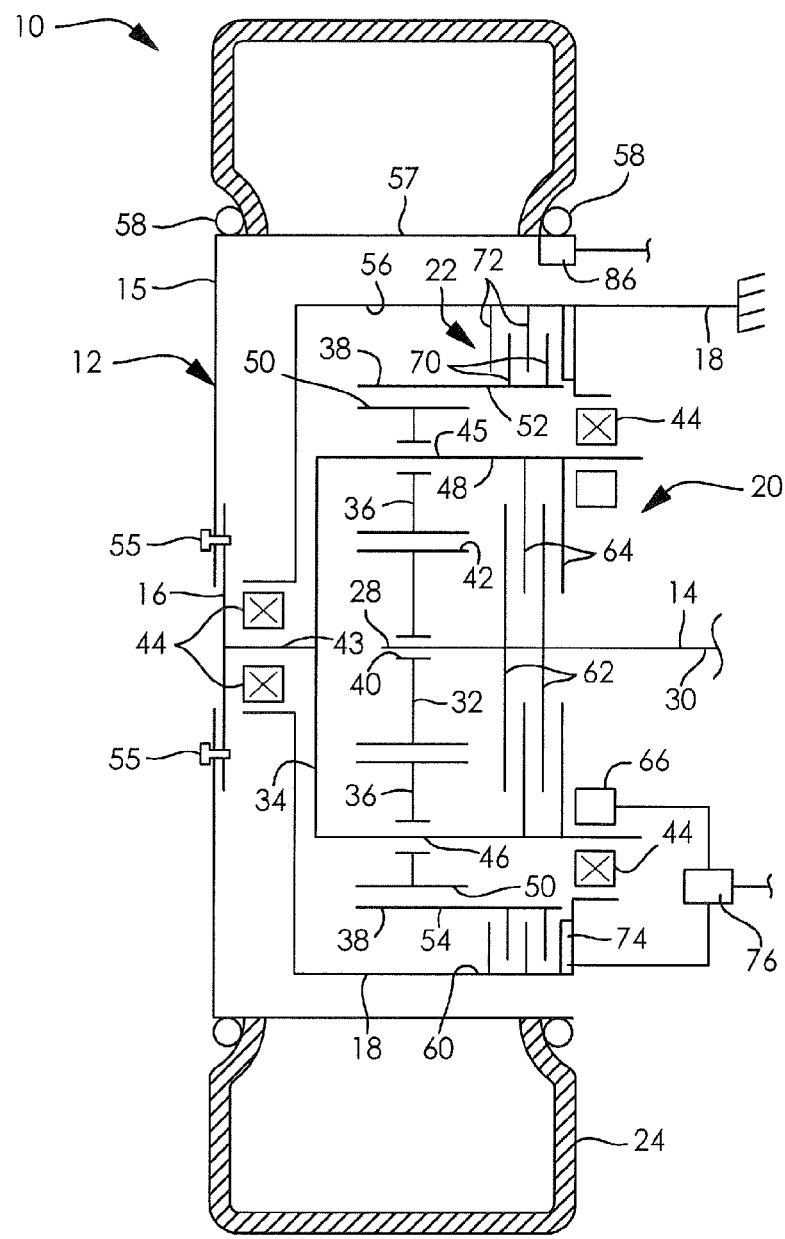
FIG. 1 is a cross-sectional view of an active wheel hub transmission according to an embodiment of the invention.

FIG. 1 illustrates a portion of a vehicle driveline 10 including an active wheel hub transmission 12. The active wheel hub transmission 12 employs a planetary gearset 13 to modify a drive ratio between an input shaft 14 and a wheel rim 15. The active wheel hub transmission 12 comprises the input shaft 14, the planetary gearset 13, a drive hub 16, a gearset casing member 18, a first clutch 20, and a second clutch 22. A tire 24 is non-rotatably disposed on the wheel rim 15. A power source 26 (shown in FIG. 3) is drivingly engaged with the active wheel hub transmission 12 through a transmission 27. The active wheel hub transmission 12 as shown in FIG. 1 is sized to fit within the wheel rim 15 of a vehicle the vehicle driveline 10 is incorporated in.

Figures 2, 3:
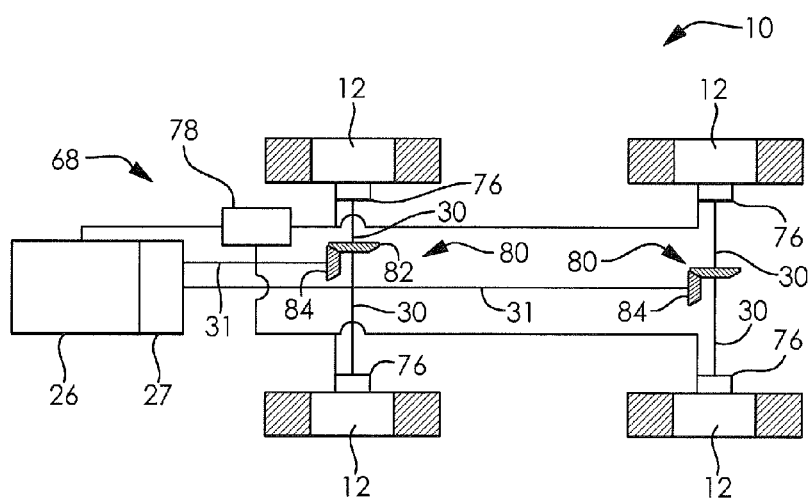
FIG. 2 is chart illustrating the modes the active wheel hub transmission shown in FIG. 1 may be placed in depending on a state of engagement of a first clutch and a second clutch.
FIG. 3 is a schematic view of a vehicle driveline including the active wheel hub transmission shown in FIG. 1.

The input shaft 14 is an elongate member having a first end 28 and a second end 30 (shown in FIG. 3). The input shaft 14 is a hollow steel shaft; however, it is understood that the input shaft 14 may be formed from other rigid materials and have other shapes. The first end 28 is drivingly engaged with a portion of the planetary gearset 13 and the second end 30 may be drivingly engaged with the power source 26 through the transmission 27 (shown in FIG. 3), a plurality of joints (not shown), and a prop shaft 31 (also shown in FIG. 3), for example. It is understood that the second end 30 may be drivingly engaged with the power source 26 in any conventional manner.

The first end 28 may comprise a plurality of splines (not shown) formed thereon for engaging a portion of the planetary gearset 13 and a portion of the first clutch 20; however, it is understood that the first end 28 may comprise any other conventional features used to facilitate driving engagement or that the first end may comprise separate features for engaging the planetary gearset 13 and the portion of the first clutch 20. The second end 30 may comprise a plurality of splines (not shown) formed thereon for engaging a portion of a joint or a side gear of a differential, for example. However, it is understood that the second end 30 may comprise any other conventional features used to facilitate driving engagement or that the second end 30 may be drivingly engaged with any conventional drivetrain component.

The planetary gearset 13 is an epicyclic gear arrangement as known in the art and comprises a sun gear 32, a carrier 34, a plurality of planet gears 36, and a ring gear 38. The sun gear 32 is drivingly engaged with the input shaft 14. The carrier 34 may be drivingly engaged with the input shaft 14 through the first clutch 20. The ring gear 38 may be drivingly engaged with the gearset casing member 18 through the second clutch 22. The carrier 34 and the ring gear 38 are rotatably disposed in the wheel rim 15.

The sun gear 32 is an annular member disposed on the first end 28 of the input shaft 14 and is drivingly engaged therewith. The sun gear 32 is a portion of the planetary gearset 13. A plurality of splines (not shown) is formed on an inner surface 40 of the sun gear 32 for engaging the plurality of splines formed on the first end 28. However, it is understood that the inner surface 40 may comprise any other conventional features used to facilitate driving engagement. A plurality of gear teeth (not shown) is formed on an outer surface 42 of the sun gear 32 for drivingly engaging the plurality of planet gears 36.

The carrier 34 an annular member disposed about a portion of the input shaft 14, the sun gear 32, and the first clutch 20. The carrier 34 is a portion of the planetary gearset 13. The carrier 34 is rotatably supported within the wheel rim 15 and is in driving engagement with the drive hub 16 through a drive end 43 of the carrier 34. Further, it is understood that at least one bearing (not shown) may be disposed between the carrier 34 and the input shaft 14 to rotatably support the carrier 34. Bearings 44 are disposed on an outer surface 45 of the carrier 34 to rotatably support the carrier within the gearset casing member 18.

The drive end 43 is an axially extending portion of the carrier 34 which is drivingly engaged with the drive hub 16. An axis of the drive end 43 is substantially aligned with an axis of the input shaft 14. The drive end 43 is coupled to the drive end 16 using a plurality of fasteners (not shown); however, it is understood that the drive end 43 may be coupled to the drive hub 16 in any conventional manner or that the drive end may be unitarily formed with the drive hub 16.

The carrier 34 comprises a plurality of planet gear journals 46 in an annular array, onto which the plurality of planet gears 36 is rotatably disposed on. Bearings (not shown) may be disposed between each of the planet gear journals 46 and the planet gears 36; however, it is understood that each of the planet gears 36 may be directly disposed on the planet gear journals 46. A plurality of splines (not shown) is formed on an inner surface 48 of the carrier 34 for engaging a portion of the first clutch 20. Alternately, it is understood that the inner surface 48 of the carrier 34 may include other features for engaging the portion of the first clutch 20.

Each of the plurality of planet gears 36 is an annular member rotatably disposed on the planet gear journals 46 of the carrier 34. The plurality of planet gears 36 is a portion of the planetary gearset 13. A plurality of gear teeth (not shown) is formed on an outer surface 50 of each of the plurality of planet gears 36 for drivingly engaging the sun gear 32 and the ring gear 38.

The ring gear 38 is an annular member disposed about a portion of the input shaft 14, the sun gear 32, and the plurality of planet gears 36. The ring gear 38 is a portion of the planetary gearset 13. The ring gear 38 is rotatably supported within the gearset casing member 15 by bearings (not shown). A plurality of gear teeth (not shown) is formed on an inner surface 52 of the ring gear 38 for drivingly engaging the plurality of planet gears 36. A plurality of splines (not shown) is formed on an outer surface 54 of the ring gear 38 for engaging a portion of the second clutch 22. Alternately, it is understood that the outer surface 54 of the ring gear 38 may include other features for engaging the portion of the second clutch 22.

The drive hub 16 is an annular member drivingly engaged with the drive end 43 of the carrier 34. As shown in FIG. 1, the drive hub 16 is disposed between the gearset casing member 18 and the wheel rim 15. The wheel rim 15 is drivingly engaged with the drive hub 16 through the use of a plurality of fasteners 55. The plurality of fasteners 55 is disposed through perforations define by the wheel rim 15 and a plurality of corresponding apertures formed defined by drive hub 16. It is understood that the apertures formed through the drive hub 16 may be threaded apertures for engaging a thread formed on each of the fasteners 55; however, it is understood that the wheel rim 15 may be coupled to the drive hub 16 in any conventional manner.

The gearset casing member 18 is an annular, cup shaped member disposed about a portion of the input shaft 14, the sun gear 32, the first clutch 20, the plurality of planet gears 36, the ring gear 38, and the second clutch 22. The gearset casing member 18 is a fixed, non-rotatable member coupled to a portion of the vehicle the vehicle driveline 10 is incorporated in. As non-limiting examples, the gearset casing member 18 may be coupled to an axle housing, a component of a suspension system, or a chassis of the vehicle. As mentioned hereinabove, bearings 44 are disposed between the carrier 34 and the gearset casing member 18 to rotatably support the gearset casing member 18. A plurality of splines (not shown) is formed on an inner surface 56 of the gearset casing member 18 for engaging a portion of the second clutch 22. Alternately, it is understood that the inner surface 56 of the gearset casing member 18 may include other features for engaging the portion of the second clutch 22.

The wheel rim 15 is an annular, cup shaped drive member disposed about a portion of the input shaft 14, the sun gear 32, the first clutch 20, the plurality of planet gears 36, the ring gear 38, the gearset casing member 18, and the second clutch 22. An outer surface 57 of the wheel rim 15 includes a pair of annular beads 58 formed thereon. Each of the annular beads 58 facilitates sealing and driving engagement between the wheel rim 15 and the tire 24. As mentioned hereinabove, the wheel rim 15 is coupled to and in driving engagement with the drive hub 16.

The first clutch 20 comprises a first plurality of clutch plates 62, a second plurality of clutch plates 64, and a first actuator 66. The first clutch 20 facilitates variable driving engagement between the input shaft 14 and the carrier 34. The first clutch 20 is a plate style clutch; however, it is understood that the first clutch 20 may be any clutching device that may be variably engaged. When the first clutch 20 is engaged, the input shaft 14 is fixed with respect to the carrier 34, and the planetary gearset 13 is placed in a "locked out" condition. Alternately, it is understood that the first clutch 20 may be configured to become engaged without an external input, and that the external input may be used to disengage the first clutch 20.

The first plurality of clutch plates 62 is interleaved with the second plurality of clutch plates 64. The first plurality of clutch plates 62 is drivingly engaged with the plurality of splines formed on the first end 28 of the input shaft 14 and the second plurality of clutch plates 64 is drivingly engaged with the plurality of splines formed on the inner surface 48 of the carrier 34.

The first actuator 66 is disposed adjacent the first plurality of clutch plates 62 and the second plurality of clutch plates 64 and may be coupled to the input shaft 14 or the carrier 34. The first actuator 66 is in communication with a control system 68 (shown in FIG. 3) to apply a force to the first plurality of clutch plates 62 and the second plurality of clutch plates 64, which causes a variable driving engagement therebetween. In response to the variable driving engagement between the first plurality of clutch plates 62 and the second plurality of clutch plates 64, the input shaft 14 is variable drivingly engaged with the carrier 34. The first actuator 66 may communicate with the control system 68 using an electrical signal or a pressurized fluid, for example.

The second clutch 22 comprises a first plurality of clutch plates 70, a second plurality of clutch plates 72, and a second actuator 74. The second clutch 22 facilitates variable driving engagement between the ring gear 38 and the gearset casing member 18. The second clutch 22 is a plate style clutch; however, it is understood that the second clutch 22 may be any clutching device that may be variable engaged. When the second clutch 22 is engaged, the ring gear 38 is fixed with respect to the gearset casing member 18. Alternately, it is understood that the second clutch 22 may be configured to become engaged without an external input, and that the external input may be used to disengage the second clutch 22.

The first plurality of clutch plates 70 is interleaved with the second plurality of clutch plates 72. The first plurality of clutch plates 70 is drivingly engaged with the plurality of splines formed on the outer surface 54 of the ring gear 38 and the second plurality of clutch plates 72 is drivingly engaged with the plurality of splines formed on the inner surface 56 of the gearset casing member 18.

The second actuator 74 is disposed adjacent the first plurality of clutch plates 70 and the second plurality of clutch plates 72 and may be coupled to the ring gear 38 or the gearset casing member 18. The second actuator 74 is in communication with the control system 68 to apply a force to the first plurality of clutch plates 70 and the second plurality of clutch plates 72, which causes a variable driving engagement therebetween. In response to the variable driving engagement between the first plurality of clutch plates 70 and the second plurality of clutch plates 72, the ring gear 38 is variable drivingly engaged with the gearset casing member 18. The second actuator 74 may communicate with the control system 68 using an electrical signal or a pressurized fluid, for example.

The control system 68 comprises a plurality of slip controllers 76 and a master controller 78. One of the plurality of slip controllers 76 is in communication with the first clutch 20 and the second clutch 22 of each of the active wheel hub transmissions 12. The plurality of slip controllers 76 is in communication with the master controller 78.

The master controller 78 monitors a rotational speed of the power source 26 and implements a torque management strategy for the vehicle the vehicle driveline 10 is incorporated in. The vehicle having the torque management strategy typically has an improved cornering performance, an improved vehicle stability, and an increased safety. Further, the torque management strategy typically reduces torque losses and improves an off-road tracking when used in vehicles having a driveline capable of four wheel drive operation.

As shown in FIGS. 1 and 3, each of the active wheel hub transmissions 12 is fitted with at least one of the slip controllers 76. Each of the slip controllers 76 engages or disengages at least one of the first clutch 20 and the second clutch 22 to permit at least one of the first clutch 20 and the second clutch 22 to be placed in a slipping condition. The plurality of slip controllers 76 can accurately control a percentage of overall torque (as determined by the master controller 78) that is directed to the wheel rim 15 by keeping at least one of the first clutch 20 and the second clutch 22 in the slipping condition. An amount of torque directed to the wheel rim 15 depends on an amount of torque applied to the input shaft 14 and a degree at least one of the first clutch 20 and the second clutch 22 are placed in the slipping condition. The slip controllers 76 being positioned adjacent at least one of the first clutch 20 and the second clutch 22 of each of the active wheel hub transmissions 12 allows the master controller 78 to accurately control an amount of torque directed to each of the wheel rims 15 by adjusting at least one of the first clutch 20 and the second clutch 22 through the slip controller 76. As a non-limiting example, the master controller 78 may direct each of the slip controllers 76 to adjust a hydraulic pressure applied to at least one of the first clutch 20 and the second clutch 22.

In use, the active wheel hub transmission 12 enables an operator of the vehicle the vehicle driveline 10 is incorporated in to select a direct drive connection or a modified drive ratio between the input shaft 14 and the wheel rim 15 for each of a plurality of gears of the transmission 27. As a result, a total number of gear ratios available to the operator of the vehicle the vehicle driveline 10 is incorporated in is doubled. As a non-limiting example, the vehicle including the active wheel hub transmission 12 has the advantages of a vehicle including an eight speed transmission by combining the active wheel hub transmission 12 with a four speed transmission. The active wheel hub transmission 12 allows a cost of the vehicle the vehicle driveline 10 is incorporated in to be reduced. As non-limiting examples, the cost of the vehicle may be reduced through the use of axles or joints having a smaller diameter or by incorporating a transmission having a reduced number of gear ratios.

When engaged, the first clutch 20 fixes the sun gear 32 to the carrier 34. When engaged, the second clutch 22 fixes the ring gear 38 to the gearset casing member 18. In this way, the active wheel hub transmission 12 allows either the direct drive connection or the modified drive ratio between each of the input shafts 14 and the wheel rims 15 depending on a state of engagement of the first clutch 20 and the second clutch 22.

FIG. 2 is a chart illustrating the modes the active wheel hub transmission 12 may be placed in depending on the state of engagement of the first clutch 20 and the second clutch 22. In addition to providing the modified drive ratio, the active wheel hub transmission 12 may be used as a vehicle parking brake when the first clutch 20 and the second clutch 22 are engaged. Further, by placing at least one of the first clutch 20 and the second clutch 22 into a slip condition (by partially engaging the at least one of the first clutch 20 and the second clutch 22, respectively), the at least one of the first clutch 20 and the second clutch 22 may be used for braking the vehicle.

The torque management strategy allows an amount of torque directed to each wheel rim 15 to be accurately controlled. Accurate control of an amount of torque directed to the wheel rim 15 allows the vehicle the vehicle driveline 10 is incorporated in to be operated without the need for an axle differential. As such, the axle differential may be replaced with a crown gear and drive pinion assembly 80, as shown in FIG. 4.

The crown gear and drive pinion assembly 80 includes a crown gear 82 and a drive pinion 84. The crown gear 82 (which is driven by the power source 26 through the transmission 27 and the drive pinion 84) is drivingly engaged with each of the input shafts 14. Alternately, it is understood that both of the input shafts 14 may be replaced with a solid, unitary axle. Use of the crown gear and drive pinion assembly 80 allows a rotational speed difference which may occur between two of the tires 24 driven by the crown gear and drive pinion assembly 80 to be accommodated by placing at least one of the first clutch 20 and the second clutch 22 of each of the active wheel hub transmissions 12 into the slip condition. The tires 24 driven by the crown gear and drive pinion assembly 80 may have a rotational speed difference when the vehicle the vehicle driveline 10 is incorporated in is cornering, for example.

Additionally, the torque management strategy allows a rotational speed of the power source 26 and an overall amount of torque produced by the power source 26 to be controlled. To control the rotational speed of the power source 26 and the overall amount of torque produced by the power source 26, the master controller 78 first receives a feedback signal from each of the slip controllers 76. The master controller 78 also determines what a rotational speed of the power source 26 should be and determines a mean engagement level for at least one of the first clutch 20 and the second clutch 22 in each of the active wheel hub transmissions 12. The mean engagement level applied to at least one of the first clutch 20 and the second clutch 22 is related to a total torque required by the vehicle driveline 10. An actual engagement level (which is directly related to an amount of slip of at least one of the first clutch 20 and the second clutch 22) acting on at least one of the first clutch 20 and the second clutch 22 may be different for each of the active wheel hub transmissions 12 depending on a given condition (for example, a slippery road condition) the vehicle is being operated in when the actual engagement level is determined. The actual engagement level reflects an actual percentage of the total torque send to each of the active wheel hub transmissions 12. To place any of the active wheel hub transmissions 12 into the slip condition, a rotational speed of the power source 26 must always be greater than a highest rotational speed of any of the wheel rims 15.

During an acceleration maneuver of the vehicle, an amount of torque applied to the vehicle drivetrain 10 is increased by the operator of the vehicle. A desired torque may be calculated by an operator intention model. The operator intention model monitoring considers an input and at least one of a plurality of requests made by the operator to the vehicle. The input and at least one of a plurality of requests made by the operator to the vehicle is then used to quantify the input and at least one of a plurality of requests in a numerical manner. Depending on a given condition the vehicle is being operated in when the desired torque is determined, (for example, a working point of the power source 26, a gear the transmission 27 is placed in, or a condition of a surface the vehicle is traversing), a certain amount of torque will be available for the acceleration maneuver. The certain amount of torque may limit the desired torque to a threshold value in some cases. The certain amount of torque is an input for the master controller 78 which directs the torque management strategy.

The master controller 78 divides the amount of torque applied to the vehicle drivetrain 10 into a plurality of portions, resulting in a target point for each of the slip controllers 76. The torque applied to each of the wheel rims 15 is related to the actual engagement level of at least one of the first clutch 20 and the second clutch 22.

A total torque amount applied to the wheel rims 15 may be calculated using the following equation (where $\alpha$ and $\beta$ are the gear ratios available through the planetary gear set):

$$T_i \approx \alpha p_{iL} // \beta p_{iH}$$

The total torque amount applied to one of the wheel rims 15 (references above as "$T_i$") is proportional either to a gear ratio of a mode multiplied by a level of engagement of an associated clutch or to a gear ratio of another mode multiplied by a level of engagement of a clutch associated with that mode. "$\alpha$" represented above may be a gear ratio for the first clutch 20, and is equal to a value of 1 as the first clutch 20 enables the direct drive connection. Further, it is understood that "$\approx$" means proportional to, "p" is a pressure applied to one of the clutches 20, 22, "L" represents the first clutch 20, "H" represents the second clutch 22, and "//" means "or."

At least one of the first clutch 20 and the second clutch 22 should continuously be placed in the slip condition to at least a minimal degree to obtain a relationship between a realized wheel torque and the actual engagement level of at least one of the first clutch 20 and the second clutch 22.

$$T_i = f(p_i)$$

Placing at least one of the first clutch 20 and the second clutch 22 in the slip condition to at least a minimal degree to obtain the relationship between the realized wheel torque and the actual engagement level must be performed when a rotational speed of the power source 26 is greater than the highest rotational speed of any of the wheel rims 15 (after accounting for the ratios acting between the vehicle drivetrain 10 and each of the wheel rims 15). When the rotational speed of the power source 26 is lower than the highest rotational speed of any of the wheel rims 15, placing at least one of the first clutch 20 and the second clutch 22 in the slip condition to obtain the relationship between the realized wheel torque and the actual engagement level is not possible.

$$\omega_{drivetrain} > \max(\omega_i) + (1 \text{ rpm})$$

The above described speed synchronization issue is resolved using one of two techniques. In the first technique, the power source 26 may be used to control the amount of torque applied to the vehicle drivetrain 10, and thus a rotational speed of the vehicle drivetrain 10. In some cases, however, the power source 26 may be a slow responding device such as an internal combustion engine, and control actions requiring a very fast response time may not be possible. Alternately, in the second technique, the master controller 78 may be used when a very fast response time is needed. By controlling the amount of torque applied to the vehicle driveline 10 with the master controller 78, the speed synchronization issue can be resolved within a needed timeframe.

When a braking function is desired using at least one of the first clutch 20 and the second clutch 22, the master controller 78 determines an amount of brake torque required for each of the wheel rims 15. The at least one of the first clutch 20 and the second clutch 22 may then be used to apply the amount of brake torque at each of the wheel rims 15. Each of the wheel rims 15 may be equipped with a sensor 86. The sensor 86 may be similar to a sensor used with an anti-lock braking system, for example, to provide the master controller 78 with an information needed to calculate the amount of brake torque required.

The amount of brake torque required to slow down the vehicle the vehicle driveline 10 is incorporate in may be calculated using the following equation:

$$T_{brake} \approx -T_H + {}^z T_L$$

The amount of brake torque is proportional to the subtraction of the two torques on the clutches 20, 22, meaning a recirculation of torque. Further, it is understood that "z" is a ratio between "α" and "β", "L" represents the first clutch 20, and "H" represents the second clutch 22.

A braking torque generated by the first clutch 20 and the second clutch 22 are indicated in FIG. 4 with dotted arrows.

Further, the braking torques acting on each of the wheel rims 15 may depend on additional constraints imposed by the components of the active wheel hub transmission 12. As a non-limiting example, the braking torques acting on each of the wheel rims 15 may be constrained by the first clutch 20 and the second clutch 22. Depending on a design and a composition (for example, a size of the clutches 20, 22 and a material used in the clutches 20, 22) of the first clutch 20 and the second clutch 22, the first clutch 20 and the second clutch 22 are limited to dissipate a certain amount of power. Due to such constraints, the design for the first clutch 20 (which facilitates the direct drive connection between the input shaft 14 and the wheel rim 15, which may also be referred to as a "high range") and the design for the second clutch 22 (which facilitates the modified drive ratio between the input shaft 14 and the wheel rim 15, which may also be referred to as a "low range") may differ from one another, resulting in different dissipation capabilities (referred to as $P_H$ and $P_L$) for the first clutch 20 and the second clutch 22. The different dissipation capabilities may be calculated using the following equations:

$$P_H = T_H * \Delta\omega_H$$

$$P_L = T_L * \Delta\omega_L$$

The velocity referred to above ($\omega_H$ and $\omega_L$) may be calculated using the following equations:

$$\Delta\omega_H = \omega_{wheel} - \omega_{central}$$

$$\Delta\omega_L = z * \omega_{wheel} - \omega_{central}$$

In view of each of the above equations, it is understood that "z" is a ratio between "α" and "β", "$\omega_{wheel}$" represents a rotational speed of the wheel rim 15, and "$\omega_{central}$" represents a rotational speed of the input shaft 14.

Using the above set of equations, an optimal drive train speed for synchronization of each the wheel rims 15, each of which may be rotating at a distinct speed, may be calculated.

Accordingly, the following procedure may be used to calculate the braking torques ($T_H$ and $T_L$) that are applied by actively controlling the first clutch 20 and the second clutch 22. Firstly, the braking torque ($T_{brake}$) must be calculated for a given set of driving conditions. The braking torque is calculated as described hereinabove using information provided by, for example, the sensor 86. Next, the dissipation capabilities for the first clutch 20 ($P_H$) and the second clutch 22 ($P_L$) are calculated. The dissipating capabilities are based on the design and the composition of the first clutch 20 and the second clutch 22 as described hereinabove. Next, a target speed of the vehicle drivetrain 10 is calculated based on the rotational speed of each of the wheels rims 15. Lastly, after obtaining the target speed of the vehicle drivetrain 10; the braking torques for each of the first clutch 20 ($T_H$) and the second clutch 22 ($T_L$) are calculated using the following formulas:

The following equation allows a mechanical motion of the vehicle driveline 10 to be calculated:

$$I_{central} \frac{d\omega_{central}}{dt} = \sum_{i=1}^{nwheels} [-T_{H,i} + Z_i T_{L,i}]$$

The following equation allows the braking torque for each of the wheel rims 15 to be calculated:

$$T_{brake} \approx -T_H + {}^z T_L$$

The braking capacity for each of the first clutch 20 ($T_H$) and the second clutch 22 ($T_L$), and thus the actual engagement level to apply to at least one of the first clutch 20 and the second clutch 22 can be calculated once a relationship between the braking torque and the actual engagement level is known.

$$T_i = f(p_i)$$

In conclusion, once a rotational speed of the vehicle drivetrain 10 is known, it is possible to fluctuate the actual engagement level applied to the first clutch 20 and the second clutch 22 of each active wheel hub transmissions 12 to generate different braking torques for each of the wheel rims 15, without the need for the vehicle driveline 10 to require a differential.

The active wheel hub transmission 12 including the planetary gearset 13 facilitates a torque multiplication at the active wheel hub transmission 12, which reduces an amount of torque applied to a portion of the vehicle driveline, such as the input shaft 14, the crown gear and drive pinion assembly 80, or the prop shaft 31, for example. Such a feature greatly reduces a strength requirement for the components of the vehicle driveline 10. As a non-limiting example, the prop shaft 31 may be able to be reduced in diameter, thus reducing a cost thereof.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A wheel hub transmission comprising:
an input shaft drivingly engaged with a power source and a planetary gear arrangement;
the planetary gear arrangement having a first portion, a second portion, and a third portion; the first portion drivingly engaged with the input shaft and the second portion drivingly engaged with the first portion and the third portion;
a casing member in one of driving engagement and selective driving engagement with the third portion;
a clutching device which may be selectively drivingly engaged with one of the first portion of the planetary gear arrangement and the input shaft and the second portion of the planetary gear arrangement;
a second clutching device which may be selectively drivingly engaged with the third portion and the casing member; and
a control system in communication with the clutching device and the second clutching device, the control system comprising a slip controller and a master controller, wherein upon engagement of the clutching device the first portion of the planetary gear arrangement is fixed with respect to the second portion of the planetary gear arrangement, the slip controller disposed adjacent at least one of the clutching device and the second clutching device, the slip controller controlling an amount of torque applied to the second portion of the planetary gear arrangement and the casing member from the input shaft, respectively.

2. The wheel hub transmission according to claim 1, wherein the second portion of the planetary gear arrangement is a carrier gear having a plurality of planet gears rotatably disposed therein.

3. The wheel hub transmission according to claim 1, wherein the third portion of the planetary gear arrangement and the second portion of the planetary gear arrangement are rotatably disposed within the casing member.

4. The wheel hub transmission according to claim 1, wherein the casing member is coupled to one of an axle housing, a component of a suspension system, and a vehicle chassis.

5. The wheel hub transmission according to claim 1, wherein the clutching device and the second clutching device may each be variably engaged to control an amount of torque applied to the second portion of the planetary gear arrangement and the casing member from the input shaft, respectively.

6. The wheel hub transmission according to claim 1, wherein the clutching device is a plate style clutch having a first plurality of plates drivingly engaged with the input shaft and a second plurality of plates drivingly engaged with the second portion of the planetary gear arrangement and the second clutching device is a plate style clutch having a first plurality of plates drivingly engaged with the third portion of the planetary gear arrangement and a second plurality of plates drivingly engaged with the casing member.

7. The wheel hub transmission according to claim 1, wherein the first portion of the planetary gear arrangement is a sun gear and the third portion of the planetary gear arrangement is a ring gear.

8. The wheel hub transmission according to claim 1, further comprising a sensor at least partially disposed on a wheel rim in driving engagement with the second portion of the planetary gear arrangement, the sensor in communication with the master controller to facilitate the master controller in calculating an amount of brake torque.

9. The wheel hub transmission according to claim 8, wherein the master controller implements a torque management strategy based on at least one of a rotational speed of the power source, an amount of torque produced by the power source, an operating condition of a vehicle the wheel hub transmission is incorporated in, a feedback signal from the slip controller, a rotational speed of the wheel rim, and the amount of brake torque calculated by the master controller.

10. The wheel hub transmission according to claim 9, wherein the master controller implements the torque management strategy by determining a target point for the slip controller, the target point representing a portion of the amount of torque produced by the power source.

11. A wheel hub transmission comprising:
an input shaft drivingly engaged with a power source and a planetary gear arrangement;
the planetary gear arrangement having a first portion, a second portion, and a third portion; the first portion drivingly engaged with the input shaft and the second portion drivingly engaged with the first portion and the third portion;
a casing member in one of driving engagement and selective driving engagement with the third portion;
a wheel rim in driving engagement with the second portion of the planetary gear arrangement;
a first clutching device which may be selectively drivingly engaged with one of the first portion of the planetary gear arrangement and the input shaft and the second portion of the planetary gear arrangement;
a second clutching device which may be selectively drivingly engaged with the third portion of the planetary gear arrangement and the casing member; and
a control system in communication with the first clutching device and the second clutching device, the control system comprising a slip controller and a master controller, wherein upon engagement of the first clutching device the first portion of the planetary gear arrangement is fixed with respect to the second portion of the planetary gear arrangement and upon engagement of the second clutching device the third portion of the planetary gear arrangement is fixed with respect to the casing member, and the master controller implements a torque management strategy based on at least one of a rotational speed of the power source, an amount of torque produced by the power source, an operating condition of a vehicle the wheel hub transmission is incorporated in, a feedback signal from the slip controller, and a rotational speed of the wheel rim.

12. The wheel hub transmission according to claim 11, wherein the second portion of the planetary gear arrangement is a carrier gear having a plurality of planet gears rotatably disposed therein.

13. A wheel hub transmission comprising:
an input shaft drivingly engaged with a power source and a planetary gear arrangement;
the planetary gear arrangement having a sun gear, a carrier having a plurality of planet gears rotatably disposed thereon, and a ring gear; the sun gear drivingly engaged with the input shaft and the plurality of planet gears drivingly engaged with the sun gear and the ring gear;

a casing member in one of driving engagement and selective driving engagement with the ring gear;

a wheel rim in driving engagement with the carrier of the planetary gear arrangement;

a first clutching device which may be selectively drivingly engaged with one of the sun gear and the input shaft and the carrier;

a second clutching device which may be selectively drivingly engaged with the ring gear and the casing member; and a control system in communication with the first clutching device and the second clutching device, the control system comprising a slip controller and a master controller;

wherein upon engagement of the first clutching device the sun gear is fixed with respect to the carrier and upon engagement of the second clutching device the ring gear is fixed with respect to the casing member, and the master controller implements a torque management strategy based on at least one of a rotational speed of the power source, an amount of torque produced by the power source, an operating condition of a vehicle the wheel hub transmission is incorporated in, a feedback signal from the slip controller, and a rotational speed of the wheel rim.

\* \* \* \* \*